United States Patent [19]
Krude

[11] 4,185,476
[45] Jan. 29, 1980

[54] CONSTANT VELOCITY UNIVERSAL JOINT

[75] Inventor: Werner Krude, Neunkirchen, Fed. Rep. of Germany

[73] Assignee: Uni-Cardan Aktiengesellschaft, Lohmar, Fed. Rep. of Germany

[21] Appl. No.: 895,053

[22] Filed: Apr. 10, 1978

[30] Foreign Application Priority Data

Apr. 22, 1977 [DE] Fed. Rep. of Germany ....... 2717936

[51] Int. Cl.² .............................................. F16D 3/30
[52] U.S. Cl. ............................................ 64/21; 64/8
[58] Field of Search ...................................... 64/21, 8

[56] References Cited
U.S. PATENT DOCUMENTS

| | | | |
|---|---|---|---|
| 3,412,580 | 11/1968 | Cull | 64/21 |
| 3,442,095 | 5/1969 | Devos | 64/21 |
| 3,553,979 | 1/1971 | Noguchi | 64/21 |
| 3,785,172 | 1/1974 | Parsons | 64/8 |
| 4,023,382 | 5/1977 | Welschof | 64/8 |

Primary Examiner—Charles J. Myhre
Assistant Examiner—R. C. Turner
Attorney, Agent, or Firm—Toren, McGeady and Stanger

[57] ABSTRACT

In a constant velocity universal joint an inner joint member fits into a cavity in a hollow outer joint member and a cage, positioned between the two joint members, has windows which guide a number of torque transmitting balls positioned in oppositely aligned grooves formed in both of the joint members. The cage is formed as one-piece and has at least one cut-out opening extending in the direction of the alignable axes of the joint members. The cut-out opening extends from one end disposed transversely of the axis of the joint members to at least a transverse plane containing the window surfaces of the cage which are more remote from the one end of the cage.

8 Claims, 17 Drawing Figures

CONSTANT VELOCITY UNIVERSAL JOINT

SUMMARY OF THE INVENTION

The present invention is directed to a constant velocity universal joint including a hollow outer joint member having grooves formed in its inner wall surface and an inner joint member positioned within the outer joint member. The inner joint member has a number of grooves in its outer surface corresponding to the grooves formed in the outer joint member. Each groove in the outer joint member is aligned opposite a grove in the inner joint member and each pair of aligned grooves accommodate one of a number of torque-transmitting balls which are guided in a one-piece cage located between the two joint members. The centers of the balls are directed by the grooves so that they are arranged in a plane which bisects the angle included by the axes of the inner and outer joint members.

In conventional constant velocity universal joints, for example U.S. Pat. No. 2,322,570, the ball cage is a one-piece component of sheet metal, however, the ends of the cage are positively formed connected to one another. Because of the sheet metal material from which the cage is made, such an arrangement requires close adherence to very precise tolerances.

Another disadvantage in this arrangement is that it is impossible to assemble the inner joint member unless it is formed as a component separate from its associated drive shaft, because the inner joint member must be turned through an angle of 90° before it can be "threaded" or introduced into the cage.

Another conventional constant velocity universal joint, note U.S. Pat. No. 2,618,942, also includes a cage produced by chipless deformation of a sheet metal blank, however, in this instance the cage is of a two-part construction, since otherwise it would be impossible to engage an inner joint member having an integrally associated shaft. This cage merely consists of an opening having a smaller diameter than the outside diameter of the inner joint member, which is the reason why the cage must be made in two parts.

It is the primary object of the present invention, in a constant velocity universal joint of the kind where the torque transmitting balls are maintained in an angle-bisecting plane by the special disposition of the ball grooves and wherein the inner joint member and its associated shaft are formed integrally, to provide a ball cage which can be inexpensively produced as a one-piece member by chipless deformation of a sheet metal blank and, at the same time, permit easy assembly of the inner joint member along with its integral shaft.

In accordance with the present invention, the cage is provided with at least one cut-out opening extending in the axialable direction of the joint with the opening extending from one end of the cage to at least a plane containing the ball-contacting surfaces of the cage windows which are more remote from the one end. Such a cage has the advantage that it can be produced form a single sheet metal blank by chipless deformation. The cage windows guiding the balls as well as the whole contour of the cage can be very easily produced in a stamping operation. Subsequently, the cage can be formed into its final shape.

An important feature of the invention allows the inner joint member to be fitted, together with its integral shaft, into the joint where the spherical outer wall surface of the cage is guided in the spherical inner surface of the outer joint member and the inner surface of the cage is guided on the spherical surface of the inner joint member. Such assembly involves pivoting or rotating the shaft through 90°. The width of the cut-out opening in the cage is at least equal to the diameter of the shaft integrally formed with the inner joint member. Due to this arrangement, the shaft can be turned to pass through the cut-out opening in order, subsequently, to achieve the final position of the inner joint member within the cage.

To avoid any weakening of the webs between adjacent cage windows and, in the case of a four-ball joint, to be able to use the cage windows for mounting or constructing two oppositely located webs formed between two adjacent ball grooves, the cut-out openings are open into the cage windows.

It is also possible, if the cage is an annular part, to arrange the cut-out opening so that it extends over the full axial extent of the cage. In that the case the cage can be made from metal strip. The strip is first subjected to a stamping operation to form the cage windows, and subsequently is rolled to form a ring, leaving, after elastic expansion of the cage, a cut-out opening which extends over the full width of the cage and has no detrimental influence whatsoever with regard to functional precision of the joint.

According to another important embodiment, the cage is closed on the end thereof opposite the one end from which the cut-opening extends in the axial direction of the joint. In other words, the closed end extends transversely of the axial direction of the joint. Such a closed configuration of the cage ensures adequate stability and meets the demands imposed by axial forces which are transmitted by the balls.

In another preferred embodiment of the invention, in a constant velocity universal joint the cage is arranged with its outer wall fitted into the inner surface of the outer joint member and its inner wall fitted into the outer surface of the inner joint member. When the cage is of a one-piece, closed end construction, it has at least two cut-out openings each having a width greater than the width of the web or ridge between two adjacent ball grooves. Further, the inner joint member includes at least two spaced ridges or webs extending radially into and axially through the openings in the cage. This arrangement has the advantage that the cage can be stamped out of sheet metal and subsequently given its final shape by chipless deformation. Two adjacent cage windows open along mutually facing sides into the cut-out opening and the opening guides two opposite ridges or webs formed on the inner joint member. In this arrangement, the inner joint member is axially fixed relative to the outer joint member with the resulting advantage that the cage is not subjected to any axial forces. The only function required of the cage is to guide the torque transmitting balls. The axial securing function which is normally ensured by the cage is in this arrangement afforded by two joint members themselves.

Another characteristic feature of the invention which affords easy assembly of a joint is where pairs of mutually opposite ridges on the inner joint member have different outside diameters and the cut-out opening in the cage, when it is formed of a one-piece and closed end construction, is at least as long as the smaller outside diameter of one pair of mutually opposite ridges. With such an arrangement, assembly of the joint is achieved in the simplest way by guiding the shaft of the inner joint member at right angles to the axis of rotation in the first part of the assembly so that the ridges which have the smaller outside diameter pass through the cut-out opening of the cage and the ridges which have the larger outside diameter pass through two adjacent cage windows into the interior of the outer joint member. The final position in assembly of the joint is obtained by subsequently rotating the shaft of the inner joint member through 90° so that the axis of the shaft will coincide with the axis of rotation of the cage.

In another mode of introducing the inner joint member into the joint, the width of the cage windows is at least equal to the width of the inner joint member in the region of its axis.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
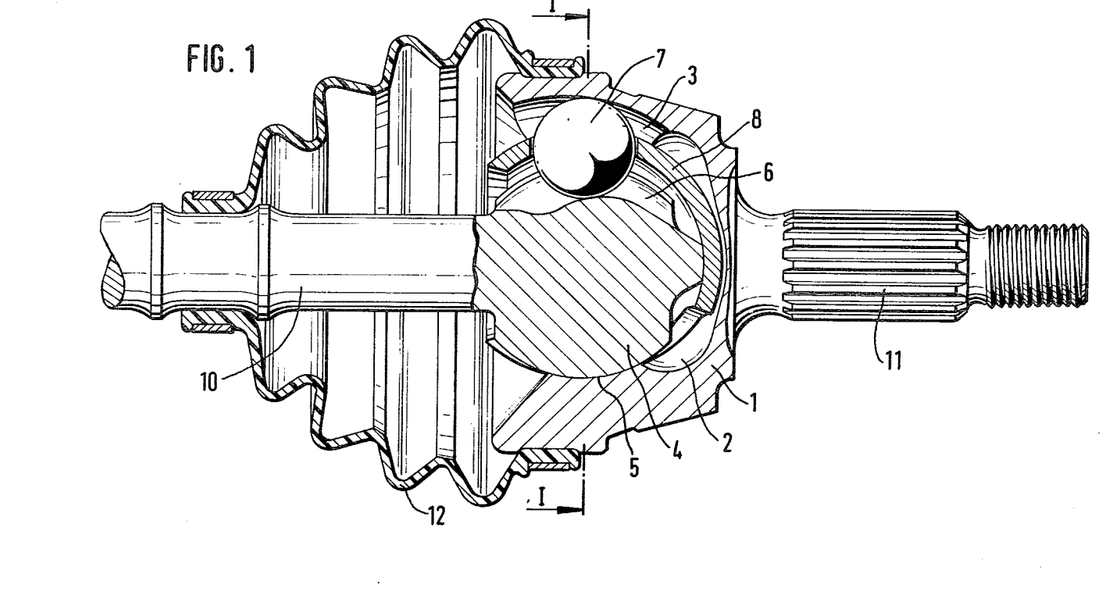
FIG. 1 is a side view, partly in section, of a constant velocity universal joint embodying the present invention and including a cage formed of sheet metal.
Figure 2:
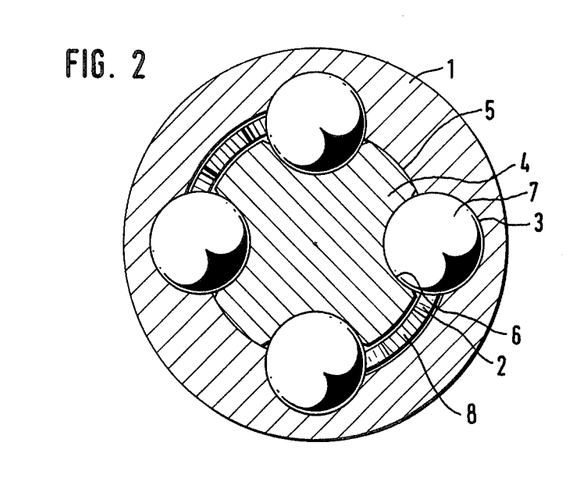
FIG. 2 is a sectional view taken along the line I—I in FIG. 1.

In FIGS. 1 and 2 a constant velocity universal joint is illustrated and includes a hollow outer joint member 1 having an interior cavity 2 with grooves formed in the surface of the cavity. Located in the cavity 2 is an inner joint member 4 having a spherically shaped outer surface 5 guided by the surface of the cavity. A number of grooves 6 corresponding to the number of grooves formed in the outer joint member 1, are formed in the surface 5 of the inner joint member 4. Accordingly, the grooves are spaced angularly about the axis of the joint members so that a plurality of pairs of grooves are provided with each pair consisting of one groove 3 in the outer joint member and one groove 6 in the inner joint member. Positioned in each pair of grooves is a torque-transmitting ball 7. The balls 7 are guided and retained in a cage 8 made of sheet metal. During any angular deflection of the universal joint, the balls 7 are maintained in a plane bisecting the angle included by the axis of the inner and outer joint members and the balls are held in this plane by the special disposition of the grooves 3, 6 and the cage 8. The cage is a one-piece member and the outer circumference of the cage is positioned on two diametrically opposite sides of the cavity 2 in the outer joint member 1. These sides or surfaces are each situated between a pair of adjacent balls 7 held by the cage. In the embodiment shown in FIGS. 1 and 2, the two remaining inner sides of the cavity in the outer joint member 1 have a smaller diameter than the above mentioned sides and these sides having a smaller radius are in direct contact with the spherical outer surface 5 of the inner joint member 4. As a result, no cage is provided in the region where the surfaces of the inner and outer joint member are in contact. The inner joint member 4 is formed integrally with its associated shaft 10 and the shaft extends axially outwardly from the inner joint member forming a continuation of the axis of the inner joint member. The outer joint member 1 has a shaft stub 11 extending outwardly from its closed end and it can be used for mounting a wheel hub or similar part. The shaft stub 11 forms a continuation of the axis of the outer joint member 1, as shown in FIG. 1, the axis of the two joint members are coaxially aligned. During swiveling action the axis of the two joint members are displaced from alignment and form an included angle with which the plane through the center of the balls 7 forms a bisecting plane. The opposite or open end of the outer joint member 1 from its shaft stub 11 is provided with a bellows 12 for sealing the joint interior.

Figure 3:
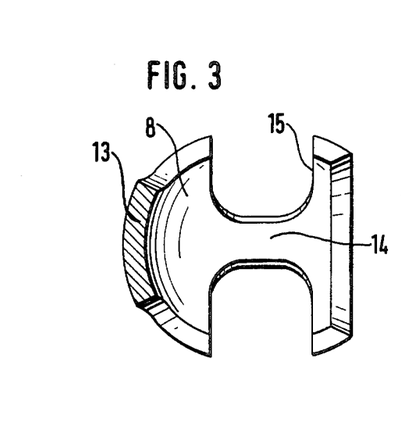
FIG. 3 is a partial view, partly in section of the cage shown in FIGS. 1 and 2.
Figure 4:
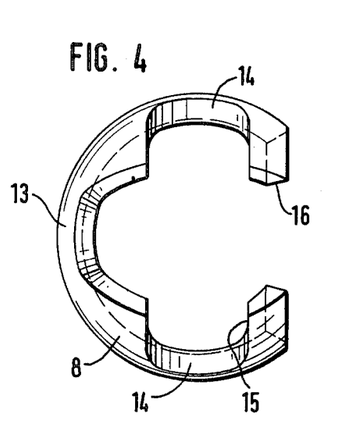
FIG. 4 is another view of the cage shown in FIG. 3 turned 90°.

FIGS. 3 and 4 display the cage 8 used in the embodiment shown in FIGS. 1 and 2. This cage 8 is stamped from a single piece of sheet metal and then formed into the configuration shown in FIG. 4. The cage 8 is closed at its rear end 13, that is, the end closer to the shaft stub 11, note FIG. 1. The closed rear end of the cage provides adequate stability, since it consists of two webs 14 extending from the closed end which accommodate the four balls 7. Four windows 15 are formed in the cage each arranged to hold and guide one of the balls 7. Each of the windows 15 has an open side remote from the web 14 in which it is formed. A cut-out opening 16 is provided in the cage 8 and allows the inner joint member 4 to be fitted into it and also permits direct guiding engagement of the inner joint member 4 with the surface of the cavity 2 in the outer joint member. The cut-out opening 16 extends from the open end of the cage 8, that is the opposite end from the closed rear end 13 to a point beyond a transverse plane including the surfaces of the windows more remote from the open front end of the cage. Because of the direct mutual contact guidance between the two joint members, the cage 8 is not subjected to any axially directed forces at all. Accordingly, the cage can be produced in the shape illustrated, because its shape is not in any way determined or affected by considerations of the application of axially directed forces. The cut-out opening extends beyond the windows 15 into the rear end 13 of the cage to afford sufficient room for fitting the inner joint member 4 into the joint assembly.

Figure 5:
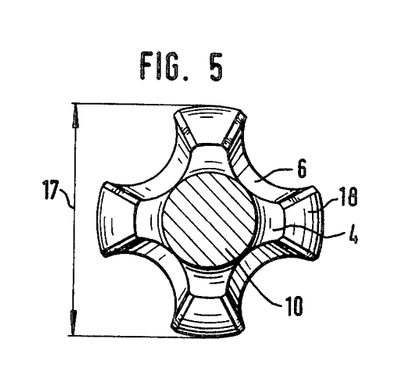
FIG. 5 is an end view of the inner joint member shown in FIGS. 1 and 2.
Figure 6:
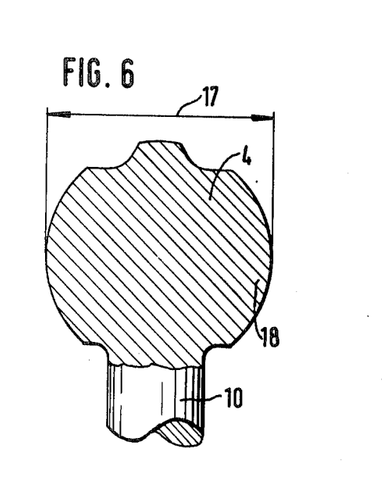
FIG. 6 is an axial sectional view of the inner joint member shown in FIG. 5.

In FIGS. 5 and 6, the inner joint member 4 has four angularly spaced grooves 6 for accommodating the four balls 7. The outside diameter of the generally spherically shaped inner joint member 4 is constant, that is, the angularly spaced webs or ridges 18 which form the lands between the ball grooves 6 each have the same outside diameter. As mentioned above, inner joint member 4 is formed integrally with its associated shaft 10.

Figure 7:
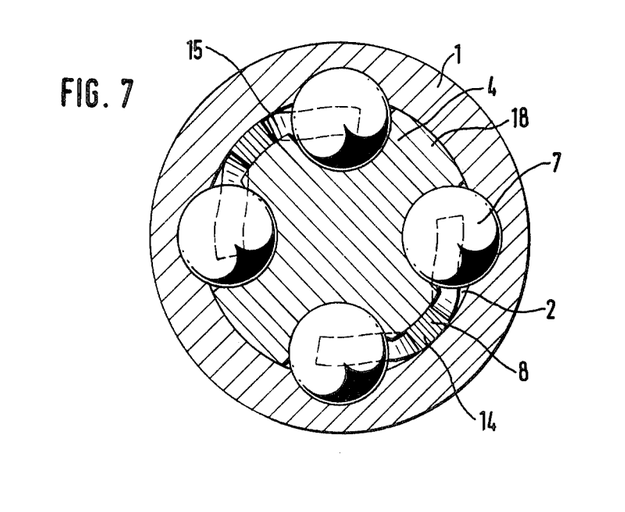
FIG. 7 is a sectional view similar to that shown in FIG. 2, however, the configuration of the inner joint member is modified.

FIG. 7 is a sectional view similar to that taken along the line I—I in FIG. 1 resembling the section in FIG. 2, however, there is the difference that the outer joint member 1 has a cavity 2 which has a constant diameter for its entire surface. The inner joint member 4, on the other hand, is guided directly on the surface of the cavity 2 of the outer joint member by one pair of diametrically opposed webs or ridges 18 while the other pair of diametrically opposed webs or ridges 18 contact and are guided by the spherical inner surface of the cage 8. The cage 8, as shown in FIGS. 3 and 4, has two webs 14 and a closed rear end 13, not shown in FIG. 7. The balls 7 are held and guided within windows 15 each of which is open along one side. The cage 8 has four windows 15. In this arrangement, the cage is free from the application of axially directed forces because these forces are absorbed by the inner joint member 4 due to the coacting guide faces on the joint members.

Figures 8, 9:
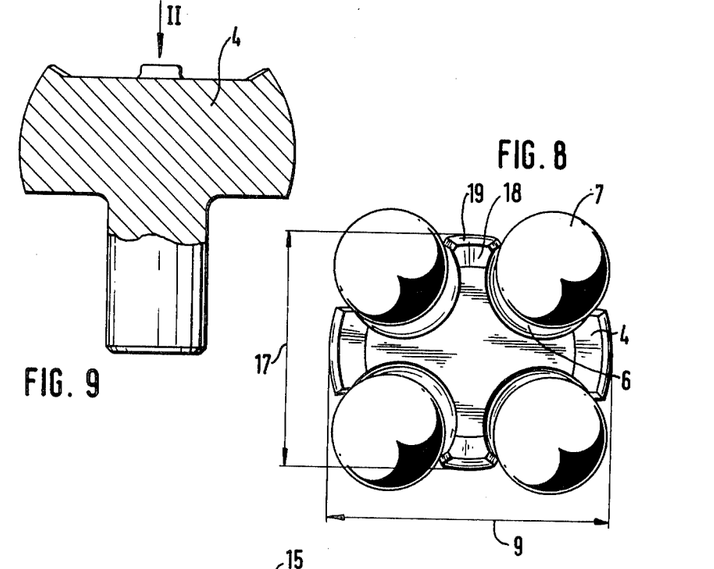
FIG. 8 is an end view of the inner joint member and balls illustrated in FIG. 7.
FIG. 9 is an axial sectional view of the inner joint member shown in FIG. 8.

The cage in this embodiment is identical with that shown in FIGS. 3 and 4, but, as can be seen from FIGS. 8 and 9, the outer surface of the inner joint member 4 is different from the inner joint member displayed in FIGS. 5 and 6. In FIG. 8, the inner joint member 4 has four ball grooves 5 in which the torque-transmitting balls 7 are fitted. The webs or ridges 18 formed between and spacing the grooves have different outside diameters. The webs or ridges 18 having the outside diameter 17 are guided on their outer faces 19 within the spherically shaped interior of the cage 8. The other pair of webs 18 on the inner joint member have the larger outside diameter 9 and are guided by the surface of the cavity 2 in the outer joint member. The webs having the larger outside diameter 9 extend through the cut-out openings 16 in the cage into direct contact with the surface of the cavity 2 of the outer joint member 1.

Figure 10:
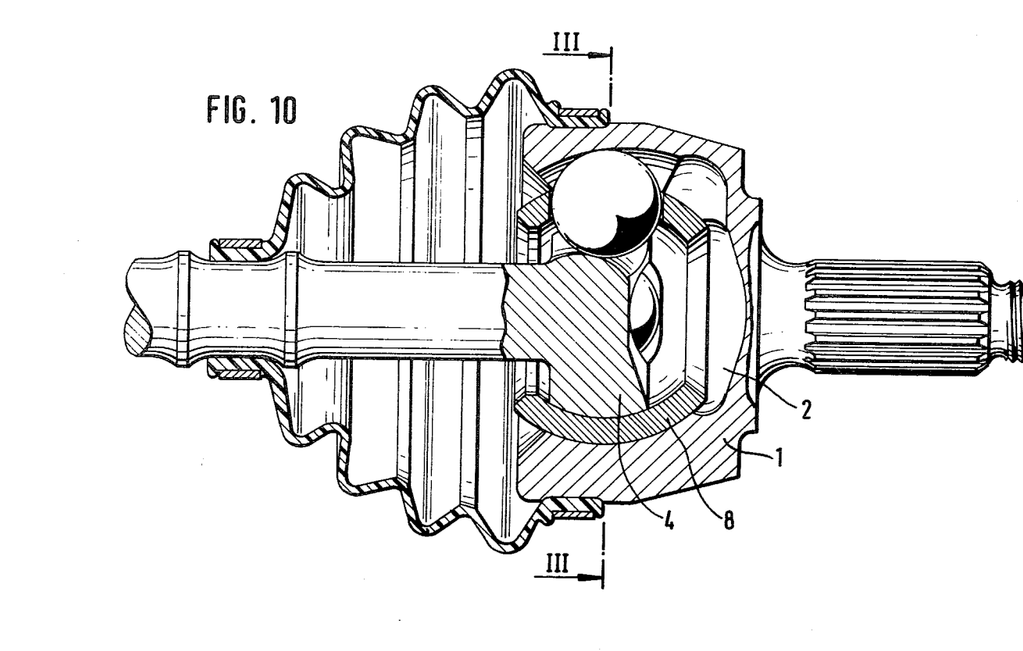
FIG. 10 is a side view, partly in section, of another embodiment of a constant velocity universal joint including a sheet metal cage.

In FIG. 10 another embodiment of a synchronous swivel joint is illustrated and includes a sheet metal cage 8. In principle, this joint is the same as shown in FIG. 1, however, there is the difference that the diameter of the cavity 2 in the outer joint member 1 is constant over its entire surface and, similarly, the outer surface of the inner joint member 4 has a constant diameter.

Figure 11:
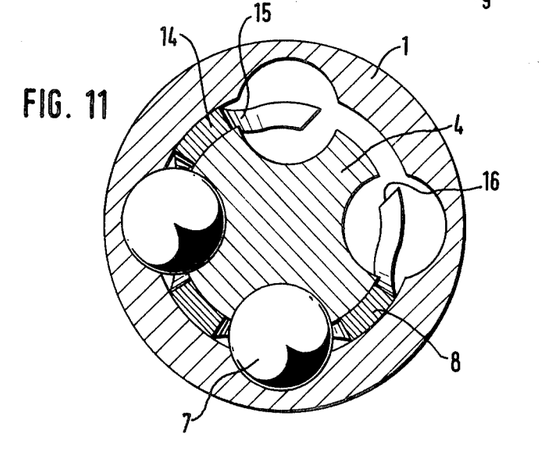
FIG. 11 is a sectional view taken along line III—III in FIG. 10.

In FIG. 11, a sectional view taken along the line III—III in FIG. 10, a different configuration of the cage 8 is illustrated. This cage 8 has four angularly spaced windows 15 for accommodating the balls 7. The cage is annular in form with three webs 14 defining the cage windows 15. As can be seen in FIG. 11, two of the windows 15 are closed on all sides while the other two windows each have an open side remote from the adjacent web and opening into the cut-out opening 16. The cut-out opening 16 permits the introduction and assembly of the inner joint member 4 within the universal joint, the inner joint member 4 consisting of an integral unit with its shaft 10.

Figure 12:
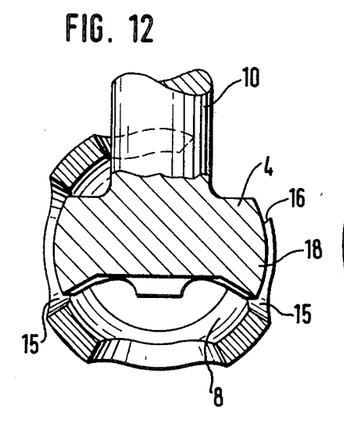
FIG. 12 is an axially extending view of the inner joint member and sheet metal cage.
Figure 13:
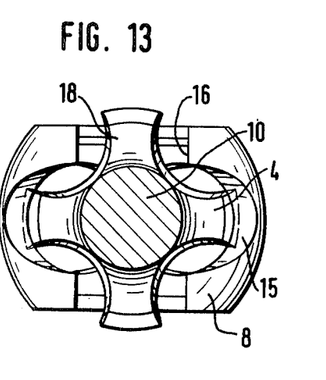
FIG. 13 is an end view of the arrangement shown in FIG. 12.

FIGS. 12 and 13 illustrate the manner of fitting the inner joint member 4 along with its integral shaft 10 into the cage 8. After the inner joint member 4 is inserted into the interior of the outer joint member 1 with two of its ridges or webs 18 passing through the opening 16 and the other two ridges or webs entering through the cage windows 15, the shaft is pivoted in such a way that it contacts one of the cage windows, note FIG. 12. Next, the shaft 10 is moved from the position shown in FIG. 12 into the cut-out opening 16. The final position is obtained by pivoting the shaft 10 perpendicularly to the plane of the drawing and eventually rotating it through 45° in the circumferential direction. The cage 8 shown in FIG. 12 has been shaped from a metal strip in which the cage windows were previously formed in a stamping operation followed by deformation of the strip into the final cage configuration.

Figure 14:
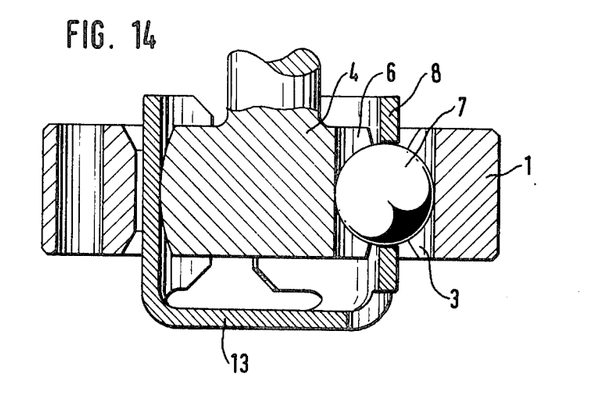
FIG. 14 is a sectional view of a constant velocity universal joint permitting relative sliding of the inner and outer joint members taken along the line IV—IV in FIG. 15.
Figure 15:
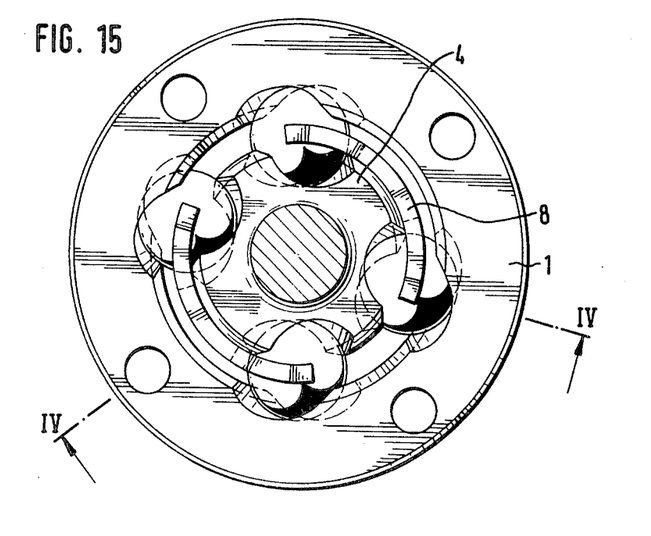
FIG. 15 is an end view of the swivel joint illustrated in FIG. 14.

FIGS. 14 and 15 illustrate another embodiment of a swivel joint with a sheet metal cage 8. This joint is designed to permit relative sliding of the inner joint member 4 and the outer joint member 1. The balls 7 are directed into the bisecting plane of the included angle of the joint member axis by the special disposition of the ball grooves in these members. In this embodiment, one groove 3 in the outer joint member 1 is aligned opposite a corresponding groove 6 in the inner joint member and, between them, this pair of grooves accommodates one of the torque transmitting balls 7. In this arrangement the cage 8 prevents any balls which happen to be in an unfavorable position from falling out upon deflection of the joint. The cage is substantially cylindrical and its rear end 13 is spaced axially from the inner joint member 4 to allow that member to execute the required sliding movement during which it is accompanied by the cage over half the distance of sliding travel.

Figure 16:
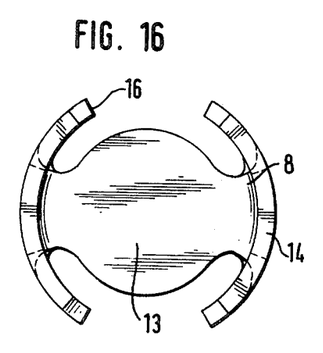
FIG. 16 is an end view of the cage shown in FIGS. 14 and 15.
Figure 17:
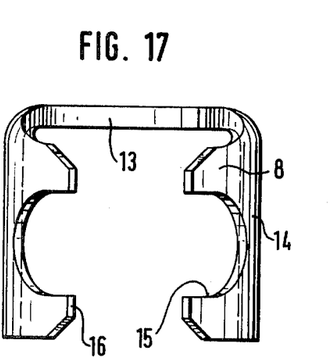
FIG. 17 is a side view of the cage illustrated in FIG. 16.

The cage 8 shown in FIGS. 15 and 16 is illustrated in FIGS. 16 and 17. The cage 8 is stamped out of sheet metal and subsequently deformed, similar to the cage shown in FIGS. 3 and 4, to the configuration shown in FIG. 17. The rear end 13 of the cage is closed to provide adequate stability, since the cage has only two webs 14 holding the four balls 7 in the cage windows 15. Consequently, the side of each of the cage windows 15 spaced outwardly from the web 14 is open. The cut-out opening 16 in this cage results from the manner in which the cage is formed and extends from its open front end to the rear end 13.

While specific embodiments of the invention have been shown and described in detail to illustrate the application of the inventive principles, it will be understood that the invention may be embodied otherwise without departing from such principles.

I claim:

1. A constant velocity universal joint comprising a hollow outer joint member having an outer surface and an inner surface defining a cavity with an opening extending through said outer joint member into the cavity, said outer joint member having an axis extending centrally through said cavity and the opening thereinto, the inner surface of said outer joint member having a plurality of grooves formed therein and spaced angularly apart around the axis of said outer joint member, an inner joint member positioned within the cavity in said outer joint member and having an outer surface facing toward the inner surface of said outer joint member, said inner joint member having an axis extending through the opening in said outer joint member and being coaxially alignable with the axis of said outer joint member, the outer surface of said inner joint member having a plurality of grooves therein corresponding in number to the grooves formed in the inner surface of said outer joint member and said grooves spaced angularly apart about the axis of said inner joint member and each of said grooves arranged to be disposed opposite to one of said grooves in said outer joint member, a plurality of torque-transmitting balls each located in one groove in said inner joint member and in the juxtaposed groove in said outer joint member, a one-piece cage located between said inner and outer joint members within the cavity in said outer joint member, said cage having a cage window therein for each of said balls and each said cage window having oppositely disposed surfaces providing a guide for said balls, the center of said balls are directed by the disposition of the cooperating said grooves into a plane which bisects the angle included by the axis of said inner and outer joint members, wherein the improvement comprises that said cage has at least one cut-out opening therethrough extending in the axial direction of said inner and outer joint members, said cage having an open front end side extending transversely of the axis of said inner and outer joint members, said cut-out opening extending from the front end side in the axial direction of said inner and outer joint members at least to beyond the transverse plane containing the surfaces of said cage windows which guide said balls and are more remote from said front end side.

2. A constant velocity universal joint, as set forth in claim 1, wherein a shaft is secured to said inner joint member and extends outwardly therefrom in the axial direction of said inner joint member, said cut-out opening having a width extending transversely of the axial direction of said inner joint member at least equal to the diameter of said shaft secured to said inner joint member.

3. A constant velocity universal joint, as set forth in claim 1, wherein said cut-out opening extends through and is open to said cage windows along one side thereof.

4. A constant velocity universal joint, as set forth in claim 1, wherein said cage having an annular configuration and said cut-out opening extending for the full axial dimension of said cage.

5. A constant velocity universal joint, as set forth in claim 1, wherein said cage having a closed end located opposite said front end side and spaced in the axial direction of said inner and outer joint members from said front end side.

6. A constant velocity universal joint, a set forth in claim 1, wherein said cage having a radially outer surface in contact with the inner surface of said outer joint member and a radially inner surface in contact with the outer surface of said inner joint member, said cage having at least two said cut-out openings each having a width in the direction transverse to the axial direction of said inner and outer joint members greater than the transverse dimension between adjacent said grooves in said inner and outer joint members and one of said inner and outer joint members having a radially projecting ridge which extends radially into and axially through said cut-out openings.

7. A constant velocity universal joint, as set forth in claim 1, wherein said cut-out opening having a dimension in the axial direction of said inner and outer joint members at least equal to the least outside diameter of said inner joint member.

8. A constant velocity universal joint, as set forth in claim 1, wherein the dimension between the oppositely disposed guide surfaces of said cage windows being at least equal to the axial dimension of said inner joint member.

* * * * *